Jan. 8, 1963 W. W. HASTINGS ETAL 3,072,150
PRESSURE-RESPONSIVE DEVICE
Filed Nov. 3, 1959

INVENTORS
WARREN W. HASTINGS
AND WILLIAM D. HUSTON
BY
Attorney

United States Patent Office 3,072,150
Patented Jan. 8, 1963

3,072,150
PRESSURE-RESPONSIVE DEVICE
Warren W. Hastings and William D. Huston, Rochester, N.Y., assignors, by mesne assignments, to American Radiator & Standard Sanitary Corporation, New York, N.Y., a corporation of Delaware
Filed Nov. 3, 1959, Ser. No. 850,625
1 Claim. (Cl. 137—788)

The present invention relates to diaphragm-operated pressure responsive devices, especially diaphragm-operated pressure gauges, electrical switches, etc. and more particularly to a means for mounting the diaphragm in such devices.

Diaphragm-operated pressure gauges, first came into practical use more than a century ago. The original diaphragm gauges were only useful for pressures up to fifty pounds per square inch. Approximately forty years ago a pressure gauge was devised which used a cup-shaped diaphragm that was nested in its support and which was rigidly held by a soft solder seal around the rim of the diaphragm and was backed up by a stop plate. The effectiveness of this seal, and the addition of a stop plate raised the effective pressure range of diaphragm gauges to approximately two hundred pounds per square inch. Some twenty years later this means of mounting the diaphragm was improved upon by the addition of a staking operation, which comprised curling and swedging material from the gauge casing over the top edge of the diaphragm to add additional reinforcement to the solder seal. This relieved the strain on the soft solder, and the principal force against the rim of the diaphragm was taken by the curled section of the case. This further raised the operating pressure of the diaphragm assembly.

Approximately five years ago the operating pressure of the diaphragm gauge was increased by welding a separate ring to the casing on top of the stop plate which supported the diaphragm against the full force of the pressure applied at the back of the diaphragm. The soft solder seal was still applied at the rim of the diaphragm to seal off the pressure and prevent leaks; but the weld ring provided the main and principal support for the diaphragm assembly. With the weld ring construction the working pressure of the gauge was increased to over six hundred pounds per square inch. This operating pressure was able to be increased even higher by employing the staking operation together with the weld ring.

The main purpose of the present invention is to provide an improved diaphragm-operated pressure responsive device which will effectively operate at pressures much higher than devices heretofore manufactured.

Another object of this invention is to provide an improved mounting for the diaphragm in a diaphragm-operated pressure responsive device which permits the diaphragm plate to be constructed of stainless steel or other corrosion-resistant alloys, thus extending the usefulness of such devices.

Another object of the invention is to provide a diaphragm-operated pressure responsive device of the character described wherein the diaphragm can readily be secured in position by simple and inexpensive means.

A further object of this invention is to provide an improved diaphragm-mounting in pressure responsive devices, where the effectiveness of the device is not limited by the strength of the diaphragm joint in tension or shear.

A further object of this invention is to provide a diaphragm mounting which will withstand increased temperatures over other mountings heretofore known.

Another object of the invention is to provide a pressure responsive device of the character described in which the diaphragm and the casing therefor are joined in a single homogenous seal.

Still another object of the invention is to provide a pressure responsive device of the character described in which the diaphragm, the stop plate and the casing or housing are joined in a single homogenous seal.

Other objects of the invention will be apparent hereinafter from the specification and the drawing, and from the recital of the appended claim.

In the embodiments of the invention illustrated herein, a thin metal cup-shaped diaphragm is welded at its upper edge to a heavy rigid housing, and the main support for the diaphragm is transferred from the diaphragm plate through the welded joint to this housing. The welding of the diaphragm rim is accomplished by arc welding using an inert gas such as argon or helium for shielding and confiinging the heat.

Figure 1:
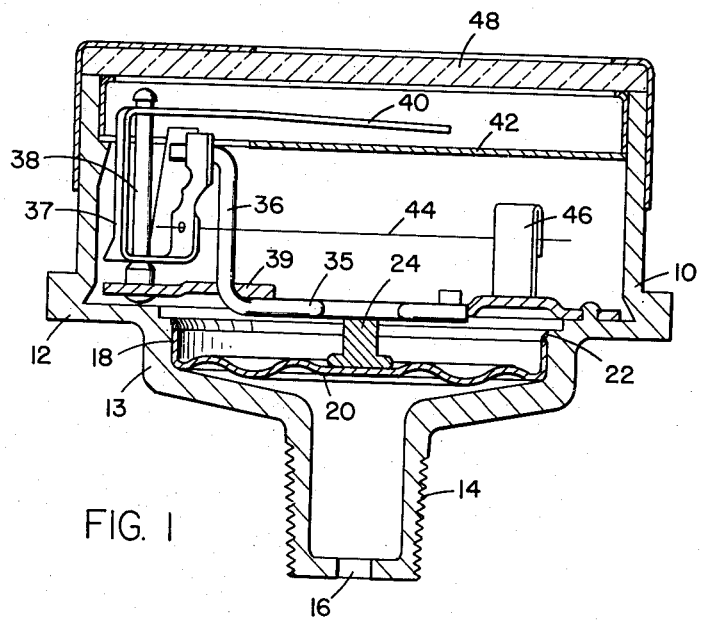
FIG. 1 is an axial section of a diaphragm-operated pressure gauge constructed according to one embodiment of this invention.

Referring first to the embodiment shown in FIG. 1, the reference numeral 10 denotes a gauge case or housing. This case is provided with a base portion 12, a diaphragm housing chamber 13, and an externally threaded generally cylindrical stem portion 14. The threaded stem portion 14 is adapted to be threaded into the vessel containing the fluid whose pressure is to be measured, or is adapted to receive a tube connection from the pressure vessel. It has an opening 16 in its lower end through which, the fluid, whose pressure is to be measured, is admitted to the diaphragm chamber.

The upper end of the stem portion 14 is closed by a flexible cupped diaphragm 20 which seats on an annular, radially disposed seat in the diaphragm chamber 13. The diaphragm has a peripheral flange 18 which bears against a confronting cylindrical surface in the diaphragm chamber 13. The diaphragm may be made in conventional fashion of relatively thin metal which is concentrically corrugated.

For mounting the diaphragm 20 in the case 10, the top edge of the flange 18 of the diaphragm is welded at 22 by heli-arc welding to the base portion 12 of the casing which securely bonds the diaphragm to the casing. With this construction, the staking operation is eliminated; the weld ring is eliminated; and the soft solder seal is also eliminated; and in one operation a homogenous seal of considerable strength is provided. The operating pressure of the gauge, or other pressure-operated device in which the diaphragm is used, then, is limited only by the strength of the diaphragm and of the casing material. If the diaphragm is stainless steel, and the casing is cold rolled steel, for example, the strength is very considerably above that of soft solder. Also, with a cupped diaphragm, such as 20, the welded joint 22 is at the top edge of the diaphragm while the pressure is applied at the back of the diaphragm opposite the welded joint. The welded joint therefore takes the pressure force against the diaphragm in compression, and thereby increases the effective burst pressure considerably over a joint that takes the pressure in tension or shear. With this construction the gauge can be used for pressure ranges of approximately eight hundred pounds per square inch with a burst pressure of over fifteen hundred pounds.

The indicating means of the gauge may be of conventional construction. Thus, it may comprise an operating stud 24 which is soldered to the diaphragm and which engages a crank arm 35. This crank arm has a right angular extension 36 which engages one leg of a U-shaped member 37 which is mounted to pivot upon a pin 38 that is secured in a plate 39 which is riveted in the case 10. The U-shaped member 37 has an indicating needle or pointer 40 formed integral with it, that it adapted to read against graduations provided on a dial 42. The dial 42 is supported in the case 10 in a conventional manner. The pointer 40 is normally held in its zero position by a spring wire 44 which is mounted at one end within a hole in one arm of the U-shaped member 37, and which is secured at its opposite end to a lug 46 that may be struck up from the plate 39. A glass 48 that is secured in conventional manner to the casing 10 closes the upper end of the case.

Figure 2:
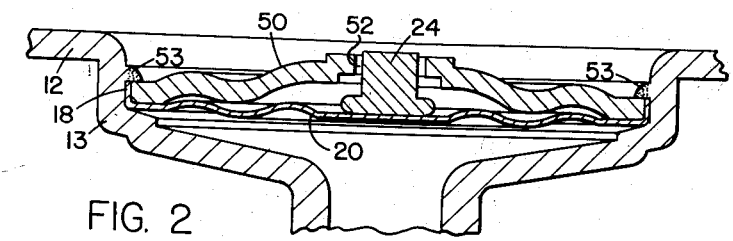
FIG. 2 is a fragmentary axial section of a diaphragm-operated pressure gauge constructed according to another embodiment of this invention.

Referring to FIG. 2, the diaphragm mounting of a modified gauge is shown which is constructed to withstand still higher pressures. In this embodiment, a relatively stiff and unyielding back plate 50, backs up the diaphragm. This back plate is also corrugated concentrically, so that when the diaphragm is sufficiently displaced axially by subjecting it to extreme pressures, substantially the entire face of the diaphragm comes into contact with the back plate 50 thus supporting the diaphragm against rupture. The back plate 50 has a central hole 52 through which the operating stud 24 projects upwardly. For mounting the diaphragm 20 and the back plate 50 in the case 10, the peripheral edge of the back plate 50, the top edge of the diaphragm 20, and the inner wall of the casing 10 are welded together at 53 by heli-arc welding as heretofore mentioned. Thus, a single welded joint joins the back plate, the diaphragm, and the casing. This construction is used where very high surges or over pressures are encountered. With this back plate construction, surge pressures of up to fifteen hundred pounds per square inch can be withstood without change in calibration, and burst pressures of over five thousand pounds per square inch can be applied without damage. Thus, the limit of pressure which the diaphragm can withstand is limited only by the strength of the casing.

Figure 3:
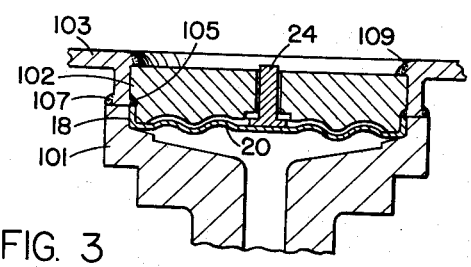
FIG. 3 is a fragmentary axial section of a diaphragm-operated pressure gauge constructed according to still another embodiment of this invention.

Referring to FIG. 3, still another construction is shown for mounting the diaphragm in a gauge where extremely high working pressures are encountered. In this construction, a fitting 101 is machined out of heavy bar stock, and a relatively very thick back plate 102 is employed. The diaphragm 20 having the peripheral flange 18, is mounted in the fitting 101, and it is backed up by the thick backing plate 102. A housing 103 surrounds the backing plate 102 and abuts against the upper edge of the heavy fitting 101. In this embodiment of the invention, the fitting 101, the backing member 102 and the diaphragm 20 are welded together at the upper edge of the flange 18 in a three-part weld as denoted at 105. Then the housing 103 is fitted around the backing member 102, and the housing 103 and the fitting 101 are welded together at 107. The backing member 102 is further welded at its top to the housing 103 as denoted at 109.

Thus, we have provided an improved construction for diaphragm mountings in pressure responsive devices whereby the rim of the diaphragm may be welded directly to the case by a two-part homogenous weld between the diaphragm plate and the casing as shown in FIG. 1, or by a three-part homogenous weld between the backing plate, the diaphragm and the casing or housing as shown in FIGS. 2 and 3.

The diaphragm mounting herein described not only gives a very nearly perfect metal to metal seal between the diaphragm and the pressure chamber but with this device, also, the pressure range of the instrument is limited only by the strength of the diaphragm. Moreover, the welded joint is not damaged by high temperatures in contrast to the soft solder seal which can be used to only approximately three hundred degrees Fahrenheit. Furthermore, the use of a welded joint permits the use of stainless and other corrosion resistant alloys for the diaphragm, and extends their use to corrosive fluids.

Although the invention herein is shown as being applied to a diaphragm-operated pressure gauge, it is apparent that it may be used in other pressure responsive devices, such as pressure switches, actuators and the like.

While the invention has been described in connection with several specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claim.

Having thus described our invention, what we claim is:

A pressure-responsive device, comprising a fitting having an inside surface defining a chamber, a cup-shaped flexible metal diaphragm having an annular flange around its periphery which projects upwardly from the upper side of said diaphragm, said diaphragm being positioned in said fitting so that the peripheral surface of said flange engages and seats directly around the whole of its peripheral surface against the opposed portion of said inside surface, a rigid metal backing plate mounted in said chamber and overlying the top edge surface of said flange, means for admitting fluid under pressure into said fitting against the under side of said diaphragm, a housing mounted on said fitting surrounding said plate, said plate and diaphragm being welded together around the whole of the annular top edge surface of said diaphragm by a single continuous welded joint which extends over said edge surface and directly bonds said edge surface to said backing plate, said plate and said housing being directly welded together around the top of said backing plate adjacent the periphery of said plate, and said housing and fitting being welded together around the peripheries of the housing and fitting, whereby the force exerted of the housing and fitting, whereby the force exerted against the under side of said diaphragm by the admitted pressure is taken in compression by the weld between the diaphragm and the housing.

References Cited in the file of this patent
UNITED STATES PATENTS

| | | |
|---|---|---|
| 2,061,761 | Gaiser | Nov. 24, 1936 |
| 2,220,902 | Hastings | Nov. 12, 1940 |
| 2,551,489 | Eichmann | May 1, 1951 |
| 2,698,766 | Cox | Jan. 4, 1955 |
| 2,703,107 | Baker | Mar. 1, 1955 |
| 2,762,394 | Hastings | Apr. 11, 1956 |
| 2,787,681 | Roeser | Apr. 2, 1957 |
| 2,839,926 | Woods et al. | June 24, 1958 |
| 2,902,861 | Frost et al. | Sept. 8, 1959 |